United States Patent [19]

Makino

[11] Patent Number: 4,764,241
[45] Date of Patent: Aug. 16, 1988

[54] APPARATUS FOR MANUFACTURING A SEAT

[75] Inventor: Hiroyuki Makino, Akishima, Japan

[73] Assignee: Tachi-S Co., Ltd., Tokyo, Japan

[21] Appl. No.: 30,230

[22] Filed: Mar. 26, 1987

[51] Int. Cl.$^4$ ............................................. B32B 31/20
[52] U.S. Cl. ..................................... 156/382; 156/285; 156/499; 156/500; 425/340; 425/345; 425/353; 425/388
[58] Field of Search ............... 156/245, 285, 382, 500, 156/499; 264/294, 511, 546, 549, 550, 551, 554, DIG. 65; 425/335, 342.1, 343, 345, 353, 385, 387.1, 388, 394, 398, 402, 403, 418, 340, DIG. 201

[56] References Cited

U.S. PATENT DOCUMENTS

| | | | |
|---|---|---|---|
| 2,691,798 | 10/1954 | Winchester et al. | 425/388 |
| 3,589,967 | 6/1971 | Shirakawa | 156/285 |
| 3,925,140 | 12/1975 | Brown | 156/382 |
| 3,992,238 | 11/1976 | Johns | 156/285 |
| 4,640,673 | 2/1987 | Takeda et al. | 425/345 |

Primary Examiner—Caleb Weston
Attorney, Agent, or Firm—Oldham & Oldham Co.

[57] ABSTRACT

Disclosed is an apparatus for manufacturing a seat by bonding together a top cover member and a foam cushion member of a seat for automobiles, in which there are provided a turntable rotatable intermittently at 90 degrees in a circular direction, four lower dies arranged at the respective four areas which are equally defined in a circular direction on the turn table, each of the four lower dies being adapted to form one seat. In this apparatus, there are also provided a supply station for supplying the top cover member to the lower dies, a heating mechanism for applying a heat to the top cover member affixed to the lower dies, a forming mechanism for forming the top cover member into a predetermined uneven shape, and a pressure bonding mechanism for pressure bonding the top cover member to the foam cushion member. Upon 360-degree rotation of the lower dies permits production of a complete unit of seats for one automobile.

9 Claims, 4 Drawing Sheets (A)

(B)

APPARATUS FOR MANUFACTURING A SEAT

BACKGROUND OF THE INVENTION

1. Field of the Invention

The present invention relates to an apparatus for manufacturing an automotive seat, and in particular to an apparatus for manufacturing an automotive seat by bonding a top cover member to a foam cushion member.

2. Description of the Prior Art

Conventionally, a seat manufacturing apparatus of this kind consists of the separate units of mechanisms: a mechanism for turning inside out a top cover member which has been formed by sewing into a bag-like (one-opened deep container) shape, and then affixing the top cover member to a lower die of an identical shape to a seat so that the lower die is inserted into the opened portion of the top cover member and covered therewith, a mechanism for applying an adhesive to the surface of the inside-out turned top cover member or that of the foam cushion member, a mechanism for placing the cushion member onto the top cover member on the lower die, and a mechanism for pressing an upper die against the top cover member and cushion member so as to bond those two members together. According to this prior art, in order to facilitate the forming of the top cover member in conformity with the uneven surface of the lower die, a heater is inserted into between the top cover member and the upper die to apply a heat to the top cover member in advance before the upper die is actuated for such pressure bonding purpose.

The abovementioned apparatus has been found disadvantageous in that such four separate memchanisms are required to be installed for manufacturing one automotive seat, as a result of which there is necessity to equip a heater operation device for causing the foregoing heater to advance or retract to an operative or inoperative position, in each of the four mechanisms, thus resulting in a large scale of operation system and long extended time of assembly of the seat.

SUMMARY OF THE INVENTION

It is a primary purpose of the present invention to provide an apparatus for manufacturing a seat which is of a small dimensions and is reduced in the time of manufacturing processes.

To this end, in accordance with the present invention, there are provided a turn table rotatable 360 degrees and upon such turn table, arranged are lower dies respectively adapted to form a front seat cushion, front seat back, rear seat cushion, and rear seat back in such a manner that the dies are located at the interval of 90 degrees relative to each other on the table and also can be turned around 360 degrees about the table. On the rotative travel path of such dies, there are provided a supply station mechanism, heating mechanism, forming mechanism and pressure bonding mechanism at 90-degree interval therebetween in sequence so that upon completion of one rotation (360 degrees) of the lower dies, one unit of seats is produced for one automobile. The forming mechanism and pressure bonding mechanism are respectively so constructed that a cross-shaped turret is rotatably provided and to each of the four ends of the turret, it is possible to mount the dies or cushion members adapted for the front seat cushion, front seat back, rear seat cushion, and rear seat back, whereby a desired one of those dies or cushion members can be selected by rotating the turret. Further, the heating mechanism is disposed at the position where the lower dies are travelled, which is advantageous in simplifying the structure of the apparatus per se.

In one aspect of the present invention, heaters are built in the respective lower dies so as to normally heat the dies. This permits softening the top cover member on each lower die and thus shortens the time for bonding the top cover members to the cushion members.

In another asepct of the present invention, a vacuum suction mechanism is provided in each of the lower dies. In this way, the aforementioned forming mechanism is not needed and omitted, thereby providing a smaller-sized, compact apparatus.

DETAILED DESCRIPTION OF A PREFERRED EMBODIMENT OF THE INVENTION

Figure 1:
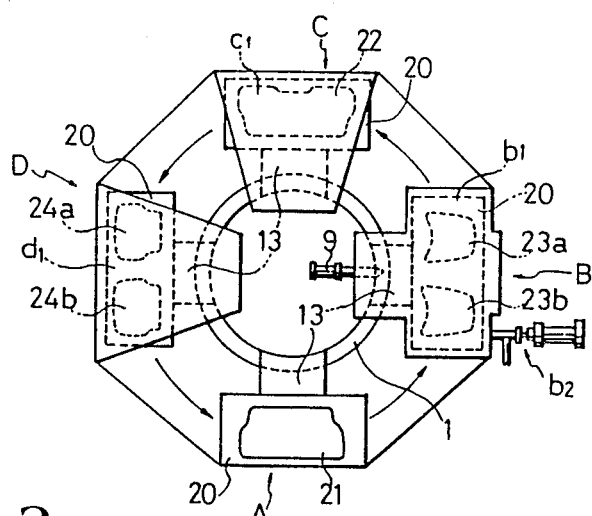
FIG. 1 is a schematic view of an apparatus according to the present invention.

Referring to FIG. 1, there is a schematic illustration of the present invention. In this figure, the reference numeral (1) represents a circular-shaped turn table which is rotated in the arrow direction by means of a motor. Surrounding the turn table (1), there are arranged a supply mechanism (A), a heating station (B), a forming mechanism (C) and a pressure bonding mechanism (D) at the 90-degree interval relative to each other.

Those elements (A), (B), (C) and (D) are respectively connected to connecting members (13),(13) . . . which are provided in a 90-degree interval relationship with each other on the turn table and extend radially therefrom. Under such mechanisms and connecting members, there is a base (10), and a pair of spaced-apart rails (11),(11) are arranged upon the base (10) in a circle fashion. Four carriages (20),(20) . . . are mounted on the rails (11),(11) so they can be travelled along the rails (11),(11).

To the four carriages, fixed are lower dies for forming a front seat cushion (24a),(24b), lower dies for forming a front seat back (23a),(23b), a lower die for forming a rear seat cushion (21) and a lower die for forming a rear seat back (22), respectively. This means that those lower dies are therefore adapted for forming one set of all required automotive seats and are fixed to each of the carriage (20), as a reault of which upon 360-degree rotation of each carriage (20), there can be assembled a complete unit of seat for one automobile.

Also, each of the lower dies (21),(22),(23a),(23b),(24a) and (24b) is so formed as to have an uneven surface corresponding to the outer configuration of the seat to be produced.

Figure 2:
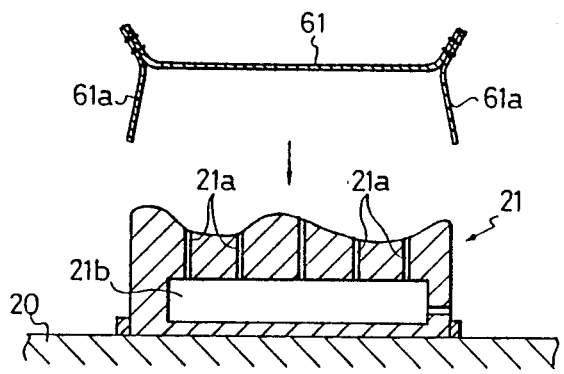
FIG. 2 (A) and FIG. 2 (B) are respectively sechematic views showing a supply mechanism.
Figure 2:
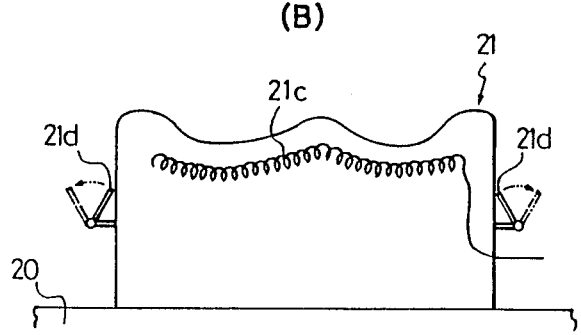

The abovementioned supply station (A) is adapted to affix a top cover member (61) over such lower dies in a covering manner. Specifically, the top cover member (61), which has been formed by sewing in conformity with the shape of the respective lower dies (21),(22),(23a),(23b),(24a) and (24b), is firstly turned inside out and affixed to those lower dies, manually. More specifically, the top cover member (61) is, in advance, formed by sewing into a bag-like shape (i.e. a one-opened deep container shape) so as to provide one for the rear seat cushion (61), one for the front seat back (62), one for the rear seat back (63) and one for the front seat cushion (64), respectively, in a predetermined shape. Thereafter, as shown in FIG. 2 (A), thus-formed top cover member (61) is turned inside out and affixed to the lower die (21). In this figure, the reference character (61a) designates a side lateral portion of the top cover member (61) which covers the side wall portion of the seat.

In this connection, the lower die (21) illustrated in FIG. 2 (A) is provided in its surface with a plurality of suction holes (21a)(21a) . . . which are in communication with a hollow portion (21b) formed within the lower die (21), whereby in the process of the heating mechanism (B) air is sucked through the suction holes (21a)(21a) . . . from the hollow portion (21b) to thereby form a vacuum and bring the top cover member (61) into close contact with the surface of the lower die (21). Accordingly, it will be seen that such top cover member (61) made of an impermeable, thermoplastic material, such as of vinyl chloride, can be treated by means of the lower die (21) of vacuum suction type, while in the case of the top cover member made of a thermoplastic woven fabric material, it can be treated by means of the non-vacuum suction type of lower die (21).

FIG. 2 (B) shows the lower die (21) in which a heater (21c) is provided and with clamps (21d)(21d) arranged thereon for securing the side lateral portions (61a)(61a) of the top cover member (61) to the lower die (21).

Figure 3:
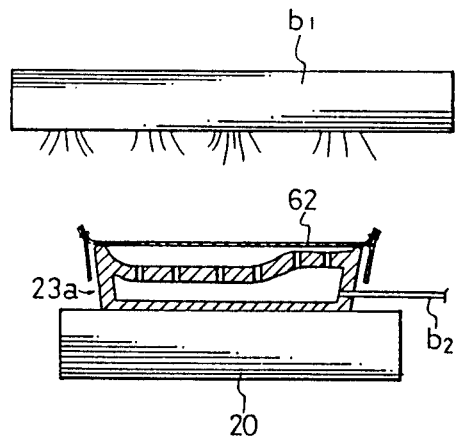
FIG. 3 is a schematic view of a heating mechanism.

In FIG. 3, there is illustrated a heating operation in the heating mechanism (B), in which the top cover member (62), which has been affixed to the each surface of the lower dies (23a)(23b) so that the top cover member (62) is in close contact with each lower die (23a)(23b), is heated by a heater provided in a heater support member (b1) and at the same time air is sucked from within the lower die (23a) by means of a vacuum pump (b2) connected with the lower die (23a) so as to draw the top cover member (62) into close contact with the surface of the lower die (23a).

Figure 4:
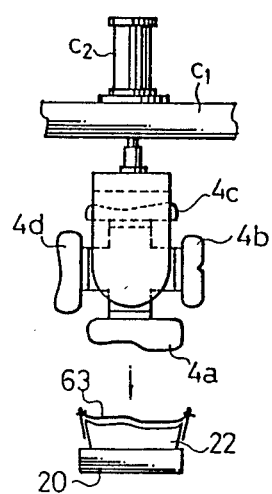
FIG. 4 is a schematic view of a forming mechanism.
Figure 5:
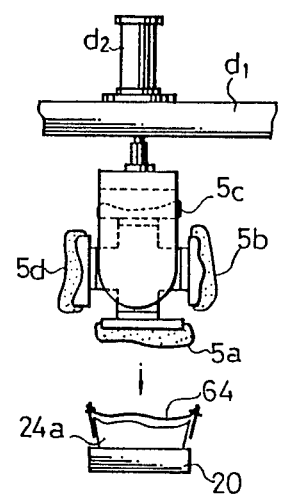
FIG. 5 is a schematic view of a pressure bonding mechanism.

Referring now to FIG. 4, the forming mechanism (C) is shown therein, which is arranged in order subsequent to the heating mechanism (B).

The illustrated forming mechanism (C) is so designed that the top cover member (63) can be formed in conformity with the surface configuration of the lower die (22); in other word, in this FIG. 4, the forming mechanism (C) employs the lower die (22) and the upper dies (4a),(4b),(4c) and (4d) for causing a pressure between the the lower and upper dies in order to form the top cover member (63) into the same shape with the outer configuration of rear seat back. The foregoing upper dies are rotatably supported and respectively adapted to form a rear seat back, a front seat cushion, a front seat back and a rear seat cushion, so that an exact one can be selected out of those dies for the corresponding lower die mentioned above. According to this forming mechanism (C), when selecting an exact upper die agaist the corresponding lower die, namely, the upper die (4a) for the lower die (21), then a pneumatic cylinder (C2) is actuated to lower the upper dies (4a), applying a pressure against the top cover member (63), so as to form a predetermined uneven shape of the top cover member (63).

Subsequent to the abovementioned forming mechanism (C), arranged is the pressure bonding mechanism (D) for bonding a cushion member (5a) of foam material (e.g. urethane foam material) to the top cover member (64) which has been press formed into a desired shape, by means of an adhesive. In this mechanism (D), there is provided a cross-shaped, rotatable turret (d4) having four portions to which attached, respectively, are the following foam cushion members which have been molded into a predetermined shape: a cushion member for front seat cushion (5a), a cushion member for rear seat back (5d), a cushion member for front seat back (tc), and a cushion member for rear seat cushion (5b). The turret (d4) is caused to move upwardly and downwardly by operation of an elevating cylinder (d2) provided on a frame (d1). Thus, when rotating the turret (d4) and selecting the cushion (5a) against the matable lower die (24a), the elevating cylinder (d2) is then operated to cause pressing and bonding together the cushion member (5a) on which an adhesive is applied and the top cover member (64) on the lower die (24a). In this way, the cushion member (5a) is bonded to the top cover member (64) in an integral manner. Next, the cushion member (5a) is removed from the turret (d4) and upon reversely turning the lateral side portion of the top cover member (64) where the pressure bonding treatment is not applied, the cushion member (5a) is covered with the top cover member (64), whereupon a seat is produced. The seat so formed is removed from the lower die (24a) at the supply station (A).

Figure 6:
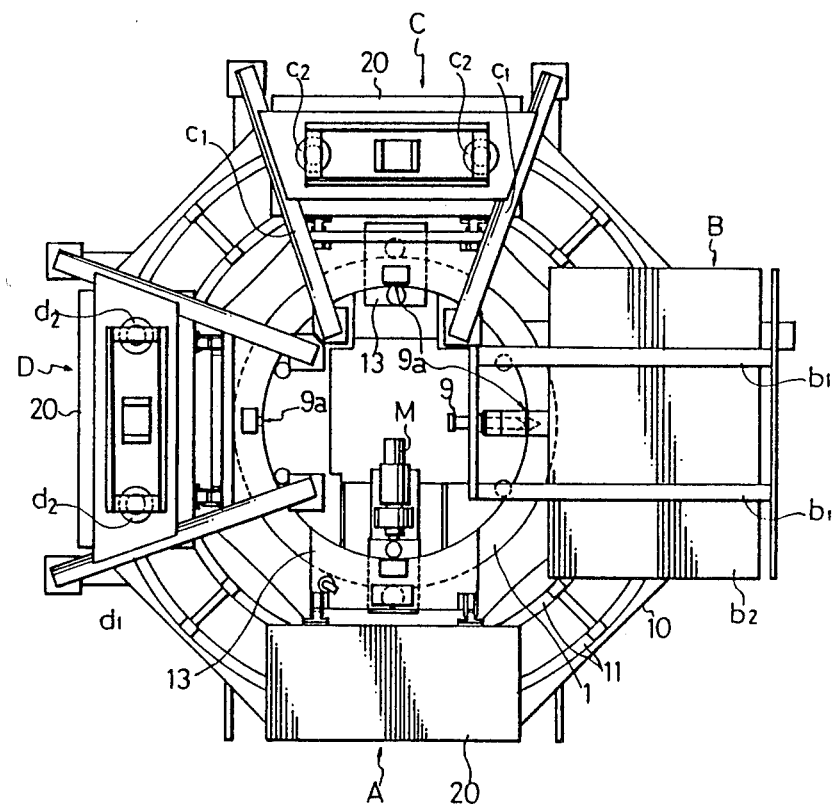
FIG. 6 is a plane view of the apparatus in the present invention.
Figure 8:
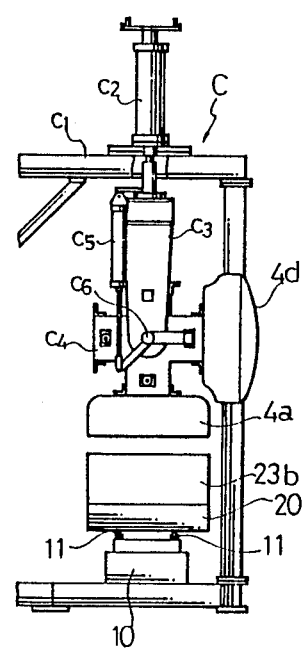
FIG. 8 is a side view of the forming mechanism.

Referring now to FIGS. 6 and 8, the supply station (A) will be described in detail. In these figures, the base (10) is formed in a plane regular octagonal shape, and the pair of spaced-apart guide rails (11) are arranged to the base (10) such that they are formed in a plane circular shape and disposed coaxially relative to the guide rails (11). On the guide rails (11), mounted are the four carriages (20) so that they are free to run along the guide rails (11).

The carriages (20) are adapted to carry the respective lower dies (21),(22),(23a),(23b),(24a) and (24b) on the top surfaces thereof, and are so arranged that they are disposed in a 90-degree interval relationship with each other.

Inwardly of the base (10), there are provided turntable supports (12) upon which the turntable (1) is fixed so that the the turntable (1) is disposed coaxially relative to the guide rails (11).

The turntable (1) is connected with a motor (M) so as to be rotatable intermittently at 90-degree interval. The carriages (20) are each fixed via respective connecting members (13) to the turn table (1).

In the drawings, the reference numeral (9) refers to a pin adapted to adjust the position of the turn table (1). The pin is inserted into one of four holes (9a) perforated in the turntable (1) at 90-degree interval of each other, thereby determining the position of the turntable (1) and thus the position of each of the carriages (20) in relation to the corresponding four mechanisms mentioned above.

It is therefore understood that each of the abovementioned lower dies carried on the respective carriages (20) are each transferred at 90-degree point by virtue of the turntable (1) being rotated.

The station (A) is a station for allowing a manual or an automatic procedure for supplying and affixing affxing the top cover member (61) to the lower die (21), and also for taking out a resultant seat which has undergone all the assembly steps in the present apparatus.

Figure 7:
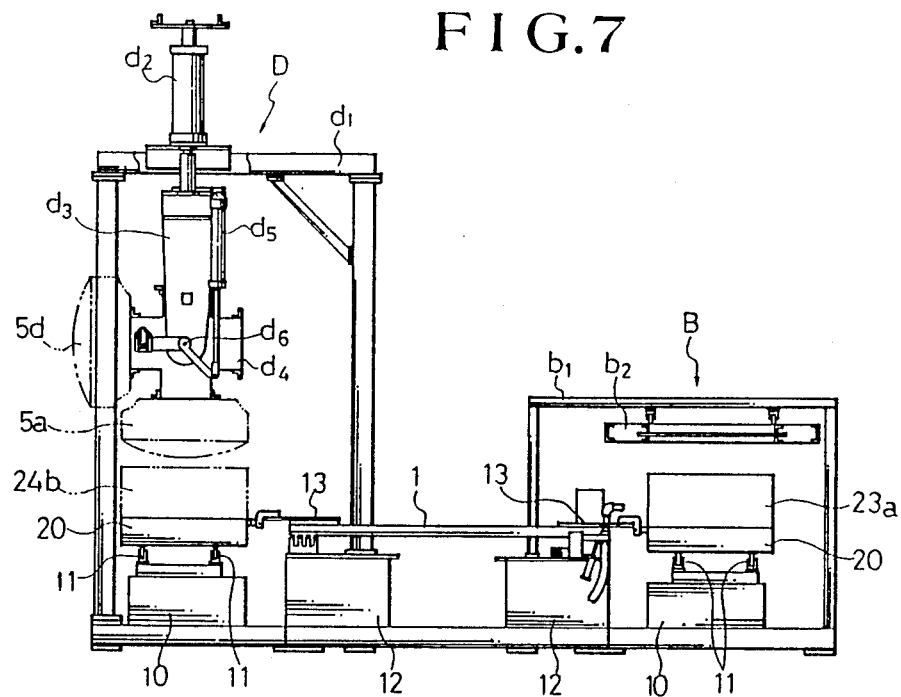
FIG. 7 is a side view of the heating mechanism and pressure bonding mechanism.

The heating mechanism (B), as shown in FIG. 7, comprises a pair of heater supports (b1) of inverted U shaped configuration which are arranged over the lower dies (23a)(23b), and a heater unit (b) provided on the heater support (b1), the heater unit (b) being faced towards the heater unit (b).

The forming mechanism (C), as shown in FIG. 8, comprises a pair of frames (c1) of inverted U shaped configuration, an elevating cylinder (c2) provided on the upper portion of the frame (c1) and a turret mounting member (c3) disposed below the elevating cylinder (c2) To the lower portion of the turret mounting member (c3), there is arranged a geneally cross-shaped turret (c4) in a rotatable manner so that it is free to rotate about a shaft (c6), the turret (c4) having the ends to which the upper dies (4a),(4b),(4c) and (4d) are respectively fixed. The turret mounting member (c3) is operatively connected to the turret (c4) by means of a changeover cylinder (c5). Operation of the changeover cylinder (c5) causes the rotation of the upper dies (4a),(4b),(4c) and (4d) and permits selecting a desired one out of those upper dies.

As illustrated in FIG. 7, the pressure bonding mechanism (D) comprises a pair of frames (d1) of inverted U shaped configuration, an elevating cylinder (d2) provided each upper portion of the frames (d1) and a turret mounting member (d3) disposed below the lower portion of the cylinder (d2). To the lower portion of the turret mounting member (d3), there is arranged a generally cross-shaped turret (d4) in a rotatable manner so that it is free to rotate about a shaft (d6). The turret (d4) has four portions for mounting cushion members thereon, to which portions a cushion member (5) are drawn closely by suction means (not shown). The turret (d4) is operatively connected to the turret mounting member (d3) by means of a changeover cylinder (d5), whereby operation of the cylinder (d5) causes rotation of the turret (d4) and thus displacement of the cushion member (5), which has been attached to one of the four portions of the turret (d4) being positioned horizontally relative to the lower die (20), in a downward direction towards the lower die (20).

It is optional to embed a metal piece in the cushion member (5) so that the cushion member may be securely attached to the turret (4) by using a magnet.

Now, a description will be given with respect to the operating procedures in the above-described embodiment of the present invention.

At first, let us assume that there are four products to be processed at the respective four elements (A),(B),(C) and (D) and that each product is therefore different in the state of assembly. In such state, specifically, at the supply station (A), the top cover member (61) is affixed to the lower die (21), at the heating mechanism (B), the top cover member (62) on the lower dies (23a)(23b) is subjected to heating, at the forming mechanism (C), the top cover member (63) having been heated at the heating mechanism (B) is applied a pressure by the upper die (4a) being lowered thereagainst so as to form a predetermined shape of the top cover member (63), and at the pressure bonding mechanism (D), the top cover member (64) formed at the forming mechanism (C) is bonded to the cushion member (5a) by means of an adhesive. It should be noted that all the abovementioned operations are carried out simultaneously Thereafter, upon 90-degree rotation of the turn table (1), the carriages (20) bearing the respective top cover members (61),(62), (63) and (64) are caused to rotate a distance corresponding to the 90-degree rotation of the turn table (1), and each of the carriages (20) is stopped at the respective mechanisms (A),(B),(C) and (D), whereupon each trim cover member undergoes a sequential processes. Then, when the first one of the carriages (20) at the supply station (A) has been rotated 360 degrees through all foregoing four elements, the top cover member on such first carriage is formed into a complete seat.

It is preferable that heating means such as a built-in heater be provided in each of the lower dies (21)(22) . . . on the carriages (20) so as to normally give out a heat.

Instead of the clamps (21d), pins, pile-type fastners or the like may be provided on the lower lateral surfaces of the lower dies (21),(22) . . . mentioned above so as to fixedly secure the side lateral portion (61a) of the top cover member (61) to those lower dies.

The heating mechanism (B) is so constructed that the heater unit (b) is controlled to provide an intermittent heat application to maintain the heat given by the heater unit in a certain fixed degree of temperature.

While at the aforementioned heating mechanism (B) the top cover member (62) is formed by vacuum and further at the following forming mechanism (C) the top cover member (63) is press formed, either of those two forming ways may be omitted for the sake of operation.

From the above description, it will be appreciated that each time the turn table (1) is rotated 90 degrees, all the top cover members (61,62,63,64) are displaced towards the corresponding mechanisms (A,B,C,D,) and all those top cover members are, simultaneously at one time, subjected to the corresponding treatment, whereby the seat assembly operation can be carried out with far improved efficiency without any unnecessary time-consuming factors involved.

Further, it will be seen that, since the four carriages (20) carry one unit of four required seats, after each of the carriages has been rotated 360 degrees for one stroke of full assembly steps, there can be produced one complete unit of seats for one automobile and therefore, it makes greatly easier the management and control of seat assembly.

What is claimed is:

1. An apparatus for manufacturing a seat comprising:
    a turntable rotatable 360 degrees in a circular direction, said turntable being so arranged that it is rotatable intermittently at 90-degree intervals;
    a plurality of lower dies arranged on said turntable such that they are disposed in 90-degree interval relationship with each other and are rotatable together with said turntable; and
    a plurality of elements so arranged that they are disposed in 90-degree interval relationship with each other on a path where said plurality of lower dies are travelled, said elements including:
    a station for supplying top cover members to be affixed to said plurality of lower dies, and for unloading assembled seats;
    a heating mechanism for applying a heat to said top cover member affixed to said lower dies;
    a forming mechanism for press forming said top cover member on said lower dies by means of upper dies into a predetermined shape; and a pressure bonding mechanism for bonding a foam cushion member to said top cover member.

2. The apparatus according to claim 1, wherein said plurality of lower dies comprise a lower die for forming a front seat cushion, a lower die for forming a front seat back, a lower die for forming a rear seat cushion and a lower die for forming a rear seat back.

3. The apparatus according to claim 1, wherein said plurality of lower dies are formed in its surface with plural suction holes so that air is sucked through said suction holes to form a vaccum to thereby draw said top cover member to said lower dies.

4. The apparatus according to claim 1, wherein each of said plurality of lower dies is provided in its outer lateral surface with means for securing a side lateral portion of said top cover member in a fixed manner.

5. The apparatus according to claim 1, wherein said heating mechanism comprises a heater unit and a heater support in such a manner that said heater unit is provided on said heater support and said heater support is arranged such that it extends over said path where said lower dies are travelled.

6. The apparatus according to claim 1, wherein said forming mechanism has a generally cross-shaped turret and said upper dies comprise an upper die for forming a front seat cushion, an upper die for forming a front seat back, an upper die for forming a rear seat cushion and an upper die for forming a rear seat back, and wherein said turret is so arranged that a desired one of said upper dies may be selected by means of a changeover cylinder and that said turret is movable upwardly and downwardly by means of an elevating cylinder.

7. The apparatus according to claim 1, wherein said pressure bonding mechanism is movable upwardly and downwardly by means of an elevating cylinder, wherein said pressure bonding mechanism has a generally cross-shaped turret which is displaceable in a desired direction by means of a changeover cylinder, and wherein to said turret. removably mounted are a cushion member for a front seat cushion, a cushion member for a rear seat back, a cushion member for a rear seat cushion and a cushion member for a rear seat back.

8. The apparatus according to claim 1, wherein said four lower dies are provided with a heater therewithin.

9. The apparatus according to claim 7, wherein said turret of said pressure bonding mechanism is provided with securing means for securing said cushion members positively to said turret and wherein said secruing means include a vacuum suction securing means and a magnetic securing means.

* * * * *